United States Patent
Whaley et al.

(10) Patent No.: US 11,368,454 B2
(45) Date of Patent: *Jun. 21, 2022

(54) IMPLICIT AUTHENTICATION FOR UNATTENDED DEVICES THAT NEED TO IDENTIFY AND AUTHENTICATE USERS

(71) Applicant: Prove Identity, Inc., New York, NY (US)

(72) Inventors: John C. Whaley, Redwood City, CA (US); Kurt W. Somerville, Oakland, CA (US)

(73) Assignee: Prove Identity, Inc., New York, NY (US)

( * ) Notice: Subject to any disclaimer, the term of this patent is extended or adjusted under 35 U.S.C. 154(b) by 112 days.

This patent is subject to a terminal disclaimer.

(21) Appl. No.: 16/385,776

(22) Filed: Apr. 16, 2019

(65) Prior Publication Data

US 2019/0245851 A1    Aug. 8, 2019

Related U.S. Application Data

(63) Continuation-in-part of application No. 15/905,607, filed on Feb. 26, 2018, now Pat. No. 10,867,025, (Continued)

(51) Int. Cl.
| | |
|---|---|
| *H04W 4/80* | (2018.01) |
| *G06F 21/31* | (2013.01) |
| *G06F 21/35* | (2013.01) |
| *H04L 9/40* | (2022.01) |
| *G06N 20/00* | (2019.01) |
| *G06V 40/10* | (2022.01) |

(Continued)

(52) U.S. Cl.
CPC ........ *H04L 63/0861* (2013.01); *G06F 21/316* (2013.01); *G06N 20/00* (2019.01); *G06V 40/10* (2022.01); *G06V 40/25* (2022.01); *H04L 63/0884* (2013.01); *H04W 4/80* (2018.02); *H04W 12/67* (2021.01); *H04W 12/68* (2021.01)

(58) Field of Classification Search
CPC .... H04L 63/0861; H04L 63/102; H04W 4/80; G06F 21/316; G06F 21/35
See application file for complete search history.

(56) References Cited

U.S. PATENT DOCUMENTS

| | | | |
|---|---|---|---|
| 8,145,561 B1 * | 3/2012 | Zhu | G06Q 20/32 705/38 |
| 8,489,635 B1 * | 7/2013 | Phoha | G06F 21/316 707/781 |

(Continued)

*Primary Examiner* — Jason Chiang
(74) *Attorney, Agent, or Firm* — Berkeley Law & Technology Group, LLP

(57) ABSTRACT

The disclosed embodiments provide a system that authenticates a user of an unattended device. In response to sensing a presence of the user in proximity to the unattended device, the system makes a call from the unattended device to an authentication service to authenticate the user. In response to the call, the authentication service authenticates the user based on recently collected sensor data, which was obtained from one or more sensors in a portable electronic device belonging to the user. If authentication succeeds, the system allows the user to proceed with an interaction with the unattended device.

36 Claims, 4 Drawing Sheets

Related U.S. Application Data which is a continuation-in-part of application No. 15/600,140, filed on May 19, 2017, now Pat. No. 11,176,231.

(60) Provisional application No. 62/338,663, filed on May 19, 2016, provisional application No. 62/466,230, filed on Mar. 2, 2017, provisional application No. 62/658,062, filed on Apr. 16, 2018.

(51) Int. Cl.
*G06V 40/20* (2022.01)
*H04W 12/67* (2021.01)
*H04W 12/68* (2021.01)

(56) References Cited

U.S. PATENT DOCUMENTS

| | | | | |
|---|---|---|---|---|
| 9,275,345 | B1* | 3/2016 | Song | G06N 20/00 |
| 9,706,406 | B1* | 7/2017 | Adams | H04W 12/0605 |
| 10,078,743 | B1* | 9/2018 | Baldi | G06F 21/316 |
| 10,438,200 | B1* | 10/2019 | Griffith | H04L 63/0853 |
| 10,501,267 | B1* | 12/2019 | Chinoy | G06K 9/00771 |
| 10,824,703 | B1* | 11/2020 | Desai | G06F 21/32 |
| 2004/0083394 | A1* | 4/2004 | Brebner | G06Q 20/382 |
| | | | | 726/19 |
| 2005/0022034 | A1* | 1/2005 | Chaudhari | G06F 21/32 |
| | | | | 726/19 |
| 2006/0294388 | A1* | 12/2006 | Abraham | G06F 21/35 |
| | | | | 713/182 |
| 2010/0042835 | A1 | 2/2010 | Lee | |
| 2010/0210242 | A1* | 8/2010 | Caudevilla Laliena | |
| | | | | H04W 12/06 |
| | | | | 455/411 |
| 2011/0022477 | A1 | 1/2011 | Hartridge et al. | |
| 2012/0164978 | A1 | 6/2012 | Conti et al. | |
| 2014/0289833 | A1* | 9/2014 | Briceno | H04L 63/08 |
| | | | | 726/7 |
| 2014/0317734 | A1* | 10/2014 | Valencia | G06F 21/316 |
| | | | | 726/22 |
| 2014/0372762 | A1* | 12/2014 | Flautner | H04W 12/0608 |
| | | | | 713/173 |
| 2015/0135310 | A1* | 5/2015 | Lee | A61B 5/681 |
| | | | | 726/20 |
| 2015/0332031 | A1* | 11/2015 | Mistry | H04W 12/06 |
| | | | | 726/19 |
| 2016/0050203 | A1* | 2/2016 | Hefetz | H04L 63/107 |
| | | | | 726/7 |
| 2016/0057623 | A1* | 2/2016 | Dutt | H04W 12/1206 |
| | | | | 455/411 |
| 2016/0103996 | A1* | 4/2016 | Salajegheh | G06F 11/3024 |
| | | | | 726/25 |
| 2016/0110528 | A1* | 4/2016 | Gupta | H04L 63/105 |
| | | | | 726/19 |
| 2016/0180068 | A1* | 6/2016 | Das | G06F 21/316 |
| | | | | 726/7 |
| 2016/0182503 | A1* | 6/2016 | Cheng | G06F 21/316 |
| | | | | 726/7 |
| 2016/0278664 | A1 | 9/2016 | Pant | |
| 2016/0295512 | A1* | 10/2016 | Hara | H04W 40/005 |
| 2016/0330199 | A1* | 11/2016 | Weiner | H04L 63/0853 |
| 2016/0342784 | A1* | 11/2016 | Beveridge | G06F 21/34 |
| 2017/0085565 | A1* | 3/2017 | Sheller | H04L 63/0853 |
| 2017/0199588 | A1* | 7/2017 | Ahn | G06F 3/0346 |
| 2017/0289168 | A1* | 10/2017 | Bar | H04L 63/0853 |
| 2018/0078179 | A1* | 3/2018 | Deng | A61B 5/6898 |

* cited by examiner

IMPLICIT AUTHENTICATION FOR UNATTENDED DEVICES THAT NEED TO IDENTIFY AND AUTHENTICATE USERS

CROSS-REFERENCE TO RELATED APPLICATIONS

This application is a continuation-in-part of, and hereby claims priority under 35 U.S.C. § 120 to, pending U.S. patent application Ser. No. 15/905,607, entitled "Opportunistically Collected Sensor Data from a Mobile Device to Facilitate User Identification," by inventor John C. Whaley, filed 26 Feb. 2018. U.S. patent application Ser. No. 15/905,607 is itself a continuation-in-part of pending U.S. patent application Ser. No. 15/600,140, entitled "Identifying and Authenticating Users Based on Passive Factors Determined from Sensor Data," by inventors John C. Whaley and Kurt W. Somerville, filed 19 May 2017. U.S. patent application Ser. No. 15/600,140 claims the benefit of U.S. Provisional Application No. 62/338,663, entitled "Authentication and Identification System," by inventor John C. Whaley, filed on 19 May 2016. U.S. patent application Ser. No. 15/905,607 claims the benefit of U.S. Provisional Patent Application Ser. No. 62/466,230, entitled "User Verification and Authentication System," by inventor John C. Whaley, filed on 2 Mar. 2017. This application claims the benefit of U.S. Provisional Patent Application Ser. No. 62/658,062, entitled "Implicit Identification for Unattended Devices that Need to Identify and Authenticate users," by inventors John C. Whaley and Kurt W. Somerville, filed on 16 Apr. 2018. The contents of all of the above-listed applications are incorporated by reference herein.

BACKGROUND

Field

The disclosed embodiments generally relate to techniques for authenticating users of unattended devices. More specifically, the disclosed embodiments relate to techniques for implicitly identifying and authenticating users of unattended devices that need to identify and authenticate users.

Related Art

Advances in computer technology are enabling users to interact with intelligent unattended devices, such as automated teller machines (ATMs), ticketing kiosks, vehicles, door locks and vending machines. During these interactions, the unattended devices need to be able to accurately identify and authenticate users. It is also desirable for such authentication operations to take place in a relatively frictionless manner so as not to degrade the user's experience.

Unfortunately, existing techniques for identifying and authenticating users of unattended devices are cumbersome and have not fully considered the user experience. For example, the use of a password or a personal identification number (PIN) has limitations, especially with respect to the user's experience. Human users are not adept at creating new passwords, which include strong and unique combinations of characters that are memorable. Furthermore, passwords and PINs are commonly phished or stolen. Moreover, the password-creation rules that websites and services enforce are ever-changing and are growing increasingly more complex. To keep up with this complexity, users often reuse passwords across multiple services, or make only small, predictable changes among passwords for different services. Also, because passwords are hard to remember, users often write them down or store them in a file for easy access, which also makes them easier to steal. Furthermore, forcing a user to authenticate through passwords or PINs adds friction to the user experience.

Other authentication techniques involve an item the user possesses, such as a bank card with a magnetic strip or a chip. However, this item can be stolen or potentially copied, for example via a card skimming device, without the user's knowledge. It is also annoying for the user to have to carry an extra item around, and requires the user to perform an action, such as inserting a card, which again adds friction.

Some authentication techniques are based on biometric factors, such as fingerprints, palm prints, facial recognition, and retina scans. However, it is often inconvenient to use such systems, and they require expensive specialized hardware. Moreover, it is very difficult or impossible to alter a biometric signature in case it is compromised.

Other authentication techniques are based on passive factors, such as cookies, IP addresses, and physical locations. With such techniques, users do not have to do anything additionally to identify themselves. However, such passive factors can only separate users into large classes, and are generally not accurate enough to authenticate a particular user.

Hence, what is needed is a technique for identifying and authenticating users of an unattended device without the above-described drawbacks of existing techniques.

SUMMARY

The disclosed embodiments provide a system that authenticates a user of an unattended device. In response to sensing a presence of the user in proximity to the unattended device, the system makes a call from the unattended device to an authentication service to authenticate the user. In response to the call, the authentication service authenticates the user based on recently collected sensor data, which was obtained from one or more sensors in a portable electronic device belonging to the user. If authentication succeeds, the system allows the user to proceed with an interaction with the unattended device.

In some embodiments, the authentication service is located in one of the following: a cloud server; the unattended device; or the portable electronic device.

In some embodiments, prior to authenticating the user, the authentication service receives the recently collected sensor data, or alternatively a feature vector generated from the recently collected sensor data, from the portable electronic device.

In some embodiments, authenticating the user involves first extracting a feature vector from the sensor data, and then analyzing the feature vector to authenticate the user, wherein the feature vector is analyzed using a model trained with sensor data previously obtained from the portable electronic device while the user was in control of the portable electronic device.

In some embodiments, the sensor data includes movement-related sensor data caused by movement of the portable electronic device while the portable electronic device is in control of the user.

In some embodiments, the movement-related sensor data includes accelerometer data gathered while the user is walking, wherein the accelerometer data reflects a characteristic gait of the user while walking.

In some embodiments, after receiving a response from the authentication service, the unattended device performs one or more additional authentication operations, including one or more of the following: asking the user for additional confirmation information; using a camera to identify the user's face, iris, eyes, body shape or body structure; using video capture to extract the user's gait, movement, or other biokinematic characteristic; using audio capture to recognize the user's voice; asking the user to insert, swipe or tap a device with a bank card; asking the user to perform an action on their portable electronic device; using a weight sensor to measure the user's weight; asking the user for another form of identification; and asking the user for a form of payment or collateral.

In some embodiments, the unattended device senses the presence of the user through one or more of the following: a signal to or from the portable electronic device; a camera; an audio sensor; an ultrasound sensor; and an infrared sensor.

In some embodiments, sensing the presence of the user in proximity to the unattended device involves the portable electronic device sensing proximity of the unattended device using one or more of the following: a Bluetooth signal; a Wi-Fi® signal; a near-field communication (NFC) signal; a Zigbee signal; a near-range radio signal; an audio signal; an ultrasound signal; a beacon; and a geofenced region.

In some embodiments, upon sensing that the user is no longer in proximity to the unattended device, the system de-authenticates the user or logs the user out.

In some embodiments, the system additionally enables the user to delegate access to the unattended device by presenting an interface to the user, wherein the interface enables the user to specify: an identity of a delegated user; and a context for the delegated access.

In some embodiments, the unattended device comprises one of the following: an automated teller machine (ATM); a ticketing kiosk; a vending machine; a parking meter; a package pickup locker; a vehicle; a door lock; a gate; a piece of heavy machinery; and a targeted advertising system.

In some embodiments, the sensors include one or more of the following: an accelerometer; a gyroscope; an inertial sensor; an ambient light sensor; an image sensor; a camera; a temperature sensor; a barometric-pressure sensor; a cellular-radio-signal-strength sensor; a Bluetooth-radio-signal-strength sensor; a near-field communication (NFC) sensor; a network-proximity sensor; an infrared sensor; and a magnetometer.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computing Environment

Figure 1:
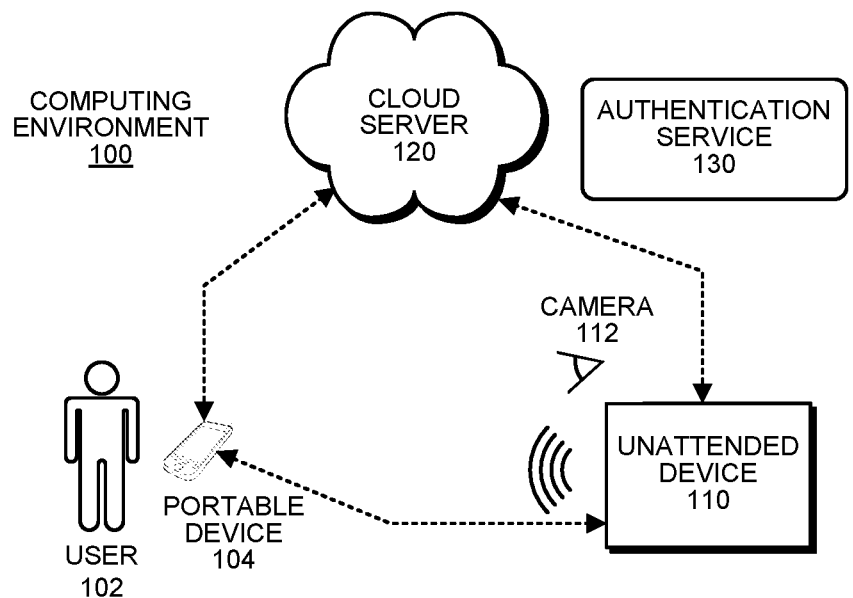
FIG. 1 illustrates a system for authenticating a user of an unattended device in accordance with the disclosed embodiments.

FIG. 1 illustrates a computing environment 100 associated with authenticating a user 102 of an unattended device 110 in accordance with the disclosed embodiments. As illustrated in FIG. 1, computing environment 100 includes a portable device 104, which is carried by a user 102. Portable device 104 can generally include any type of portable electronic device, which can be carried by user 102, such as a smartphone, or a wearable device, such as a smartwatch. Portable device 104 includes a number of sensors that can be used to uniquely identify the user, or verify that an action is actually performed by the user. For example, portable electronic device 104 can include sensors such as: a touchscreen; an accelerometer; a gyroscope; an inertial sensor; an ambient light sensor; a camera; a temperature sensor; a barometric-pressure sensor; a cellular-radio-signal-strength sensor; a Bluetooth-radio-signal-strength sensor; a near-field communication (NFC) sensor; an infrared sensor; a battery sensor; a force-touch measurement sensor; a multi-touch measurement sensor; a camera; a network proximity sensor; and a microphone.

Data from these sensors can be used for a number of purposes, including: (1) establishing the identity of the user; (2) detecting a proximity of the user to the unattended device; (3) determining the user's intent; and (4) authenticating the user. The identity of the user can be captured through the user's portable device, via a passive factor, such as scanning the user's face with a camera, or via an explicit action by the user, such as entering their name or an identification number.

The proximity of the user to the unattended device can be detected through: sensors on the unattended device; sensors on a portable device carried or worn by the user; or sensors that are independent of the unattended device and the portable device. For example, cameras, proximity sensors, infrared sensors, ultrasound sensors, weight sensors, or digital signal sensors (e.g., Bluetooth signal sensors) can be used to detect user proximity.

The intent of the user to authenticate to the device can be determined through multiple techniques, including but not limited to: the user's actions; the user's approach to the unattended device; the user's behavior and movement upon approaching the unattended device; the user's previous behavior at this or other unattended devices; or an explicit user action, such as pressing a button, entering a code, selecting an option, touching a screen or using a fingerprint reader. Intent can also be determined based on an action performed by the user before approaching the unattended device, including declaring an intention to use or authenticate with the unattended device during a previous interaction. Authentication of the user can also occur implicitly (e.g., automatically via passive authentication factors), explicitly through a specific action by the user (like impressing a fingerprint or entering a PIN), or through some combination thereof.

Unattended device 110 can generally include any type of device or machine that can be accessed by user 102. For example, unattended device 110 can include: an automated teller machine (ATM); a ticketing kiosk; a vending machine; a parking meter; a package-pickup locker; a vehicle, such as a car, a bus, a train, an autonomous vehicle, a shuttle, a bicycle, or a scooter; a drone; a door lock; a gate; a piece of heavy machinery; and a targeted advertising system, such as an electronic billboard, a display screen, or a directed audio device. Computing environment 100 can also include other devices with sensors, which are located in the vicinity of unattended device 110 to provide additional authentication information, such as: a camera 112; an audio sensor; an ultrasound sensor; or an infrared sensor.

Computing environment 100 also includes an authentication service 130 that performs the authentication operations. Authentication service 130 can possibly be located in: an external cloud server 120; unattended device 110; or portable electronic device 104. Authentication service 130 makes use of various communication pathways, which connect portable device 104, cloud server 120 and unattended device 110, to communicate information to facilitate the authentication operations. These communication pathways are represented by the dashed lines in FIG. 1.

Figure 2:
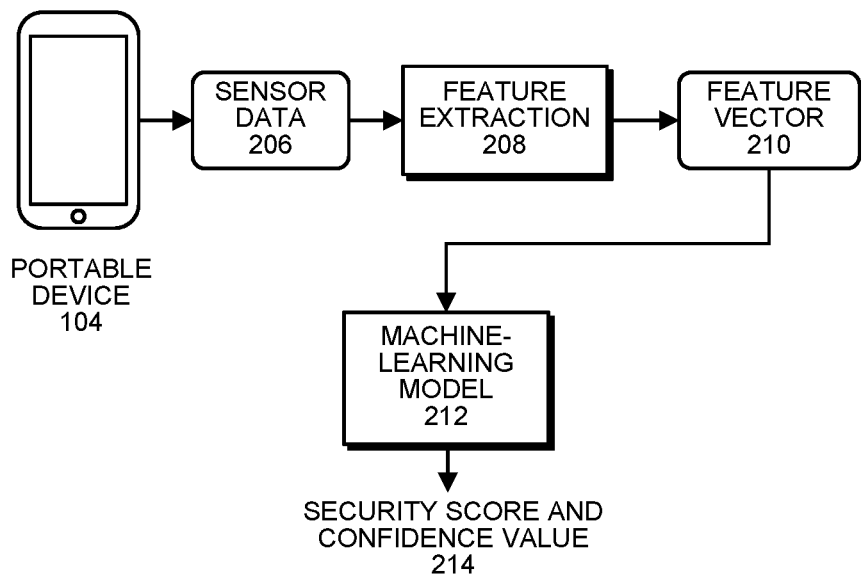
FIG. 2 illustrates how sensor data is used during the authentication process in accordance with the disclosed embodiments.

FIG. 2 illustrates how sensor data 206 is used during the authentication process in accordance with the disclosed embodiments. As shown in FIG. 2, during operation of a portable device 104, an agent that is running on portable device 104 collects sensor data 206. Next, a feature-extraction operation 208 is performed on sensor data 206 to produce a feature vector 210. (This feature-extraction operation 208 can be performed by portable device 104 or by authentication service 130.) In general, feature-extraction operation 208 can include various operations for processing sensor data, including: filtering operations; conversions among the time, space and frequency domains; Fourier transforms; Butterworth filters; Z-plane analysis operations; wavelet transforms; or other operations to extract information from sensor data. Also, note that feature vector 210 can include a timestamp for sensor data 206.

Feature vector 210 is fed into a machine-learning model 212, which was trained with sensor data previously obtained from portable device 104 while user 102 was in control of portable device 104, to determine a security score and associated confidence value 214. This security score indicates a probability that the sensor data 206 is associated with user 102. Note that machine-learning model 212 can generally include any type of model that can be trained to recognize sensor data associated with user 102. For example, machine-learning model 212 can include a model, which is based on: neural networks, support-vector machines (SVMs), Bayesian classifiers, K-nearest-neighbor (KNN) models, regression-based models, linear-discriminant-analysis models, and decision-tree-based models.

Authentication Process

Figure 3:
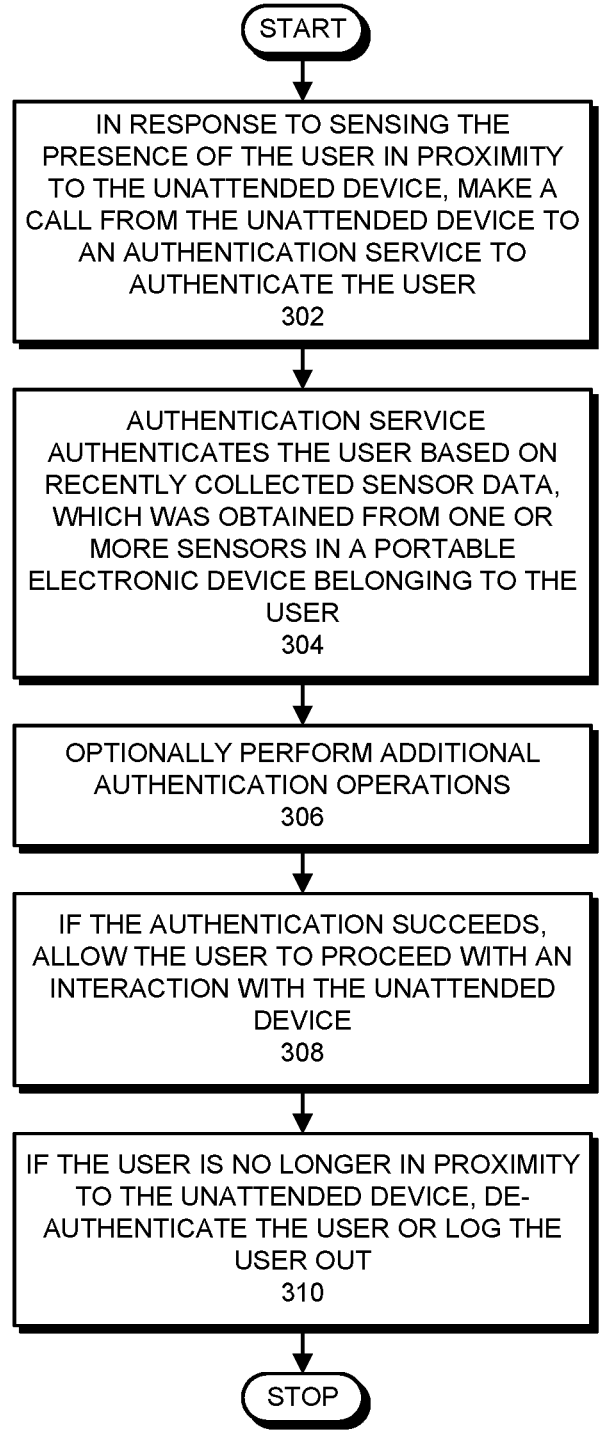
FIG. 3 presents a flow chart illustrating operations involved in authenticating a user of an unattended device in accordance with the disclosed embodiments.

FIG. 3 presents a flow chart illustrating operations involved in authenticating a user of an unattended device in accordance with the disclosed embodiments. During operation of the system, in response to sensing a presence of the user in proximity to the unattended device, the system makes a call from the unattended device to an authentication service to authenticate the user (step 302).

The presence of the user in proximity to the unattended device can be detected in a number of ways. For example, the unattended device can sense the user approach through: a signal to or from the user's personal device (for example, through Bluetooth, Wi-Fi, NFC, Zigbee, near-range radio, or a beacon); a camera (photo or video); or an audio/ultrasound sensor. Alternatively, the personal device can sense that the unattended device is nearby, through some type of signal (e.g., Bluetooth, Wi-Fi, NFC, Zigbee, near-range radio, or a beacon), a geofenced region, or an audio/ultrasound sensor. In the case of multiple unattended devices, which are near each other, the unattended devices can use techniques that measure Bluetooth signal strength, a camera signal, or an audio/ultrasound signal to determine which of the unattended devices the user is approaching. An unattended device can also use similar techniques for the case wherein there exist multiple users who are near each other.

Next, the authentication service authenticates the user based on recently collected sensor data, which was obtained from one or more sensors in the portable device belonging to the user (step 304). This recently collected sensor data can be used to determine various user attributes or environmental factors associated with the user, such as: a user gait; a user grip; a user motion or other biokinematics; a user motion associated with checking a notification; a user motion associated with unlocking or authenticating to a device; a user motion while answering a phone call; a personal device orientation with respect to a frame of reference; the user's location history; signals from other devices (such as Bluetooth or Wi-Fi devices); prior interactions with other devices; signals from wearable devices; sensor information from a car or other vehicle; sensor information from a third-party device; behavioral data from the user's routine; suspicious activities and motions (such as handoff detection, sudden movement, idle detection, or on-body detection state changes); the user's voice; ambient sound; ambient light from the immediate environment; photos or videos captured from the user's camera; events on the device (such as when the screen turns on or when a call is made); button presses on the personal device; application events; touchscreen events (including the specifics, such as touch pressure, trajectory, or shape, or data captured by motion sensors); the position, pressure, and/or shape of fingers around the edge of a personal device; measurements of a damping response from a stimulus like sound (including infrasonic or ultrasonic, or combinations thereof); or vibrations (from a vibrator motor or other actuator). Note that the authentication service can take into account historical data as well as recent data.

After this authentication operation, the system can optionally perform additional authentication operations (step 306). For example, the system can: ask the user for additional confirmation information (such as a PIN or a knowledge-based factor); use a camera to identify the user's face, iris, eyes, body shape or body structure; use video capture to extract the user's gait, movement, or other biokinematic characteristics; use audio capture to recognize the user's voice (optionally prompting them to read a phrase); ask the user to insert, swipe or tap a device with a bank card; ask the user to perform an action on their portable device; use a weight sensor to measure the user's weight; ask the user for another form of identification or authentication; or ask the user for a form of payment or collateral.

If authentication succeeds, the system allows the user to proceed with an interaction with the unattended device (step 308). On the other hand, if the authentication fails, the unattended device can block the transaction, or can require additional authentication steps, such as calling in to a service representative. Also, the unattended device or the authentication service can log information about the authentication failure, flag it as suspicious or for review, or alert an employee, such as a security guard or bank employee. The unattended device can optionally allow the transaction to proceed, or block the transaction. It can also notify the correct user about the failed authentication attempt. Optionally, the final result of the authentication process can be reported to the authentication service to facilitate an understanding of user behavior, system improvements, and for auditing purposes. Finally, if the user is no longer in proximity to the unattended device, the system de-authenticates the user or logs the user out (step 310).

Figure 4:
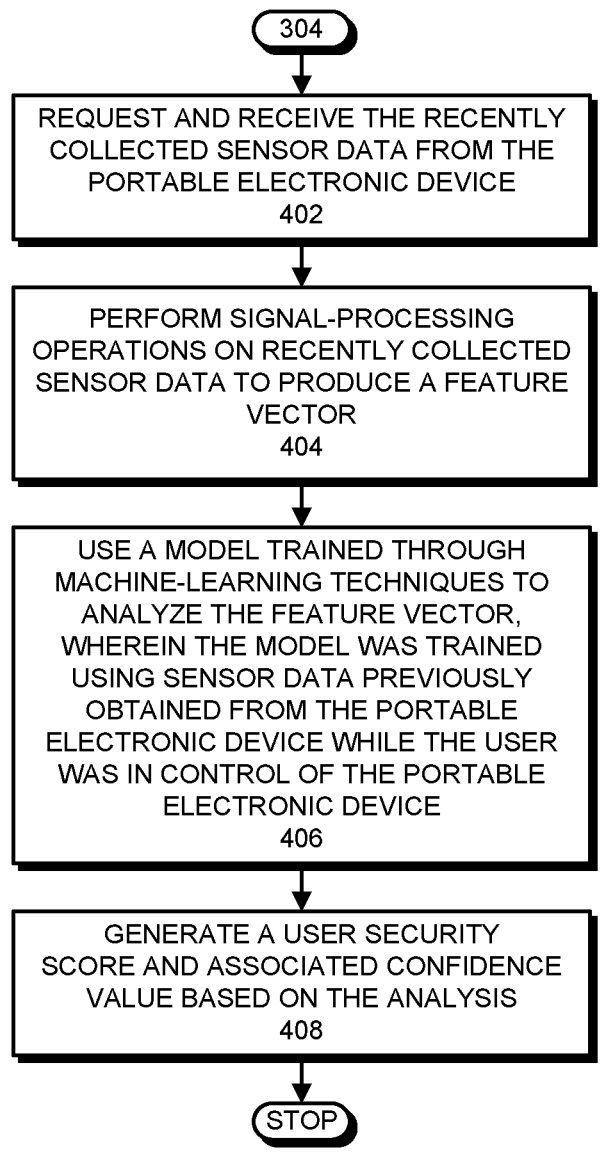
FIG. 4 presents a flow chart illustrating additional details of the operations involved in authenticating a user of the unattended device in accordance with the disclosed embodiments.

FIG. 4 presents a flow chart illustrating details of operations involved in authenticating a user of a portable device in accordance with the disclosed embodiments. (This flow chart illustrates specific details about the operations performed in step 304 of the flow chart in FIG. 3.) First, the system requests and receives the recently collected sensor data from the portable electronic device (step 402). Next, the system performs signal-processing operations on the recently collected data to produce a feature vector (step 404). Then, the system uses a model trained through machine-learning techniques to analyze the feature vector, wherein the model was trained using sensor data previously obtained from the portable electronic device while the user was in control of the portable electronic device (step 406). Finally, the system generates a user security score and confidence value based on the analysis (step 408).

Figure 5:
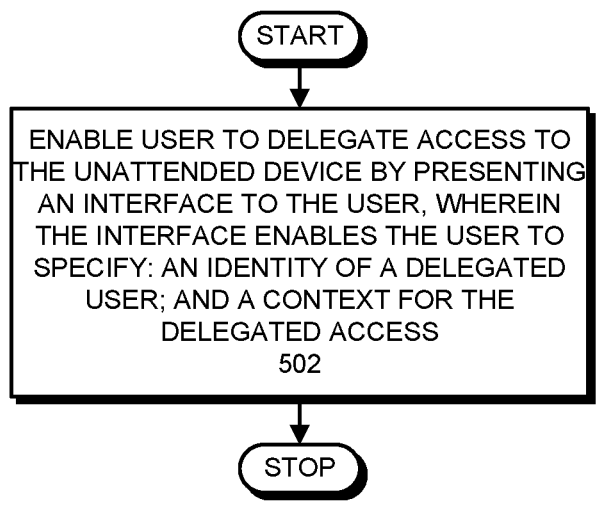
FIG. 5 presents a flow chart illustrating operations involved in delegating access to the unattended device in accordance with the disclosed embodiments.

FIG. 5 presents a flow chart illustrating operations involved in delegating access to the unattended device in accordance with the disclosed embodiments. Note that delegating access to another user enables the other user to interact with the unattended device on behalf of the original user. The user can specify this delegation via: some form of communication, a smartphone, an app, a website, in person, or via another authenticated interaction. Optionally, the original user can be notified when the delegated user attempts to authenticate and is successful or unsuccessful. Optionally, the original user can be notified in real time and choose whether or not to actually grant access. During this delegation process, the system enables the user to delegate access to the unattended device by presenting an interface to the user, wherein the interface enables the user to specify: an identity of a delegated user; and a context for the delegated access (step 502).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for authenticating a user of an unattended device, comprising:
    collecting sensor data from one or more sensors in a portable electronic device possessed by the user in response to trigger events sent at a variable interval determined based on feedback generated by a learner that processes the collected sensor data, the generated feedback being based, at least in part, on a change in a confidence level of the identity of the user, a battery level of the portable electronic device, a usage pattern of the portable electronic device, and a notification received at the portable electronic device;
    in response to sensing a presence of the user in proximity to the unattended device, making a call from the unattended device to an authentication service to authenticate the user;
    in response to the call, the authentication service authenticating the user
    based, at least in part, on the collected sensor data; and
    responsive to authentication succeeding, allowing the user to proceed with an interaction with the unattended device.

2. The method of claim 1, wherein the authentication service is located in one of the following:
    a cloud server;
    the unattended device; and
    the portable electronic device.

3. The method of claim 1, wherein prior to authenticating the user, the authentication service receives the collected sensor data, or alternatively a feature vector generated from the collected sensor data, from the portable electronic device.

4. The method of claim 1, wherein authenticating the user involves:
    extracting a feature vector from the sensor data; and
    analyzing the feature vector to authenticate the user, wherein the feature vector is analyzed using a model trained with sensor data previously obtained from the portable electronic device while the user was in control of the portable electronic device.

5. The method of claim 1, wherein the sensor data includes movement-related sensor data caused by movement of the portable electronic device while the portable electronic device is under the control of the user.

6. The method of claim 5,
    wherein the movement-related sensor data includes accelerometer data gathered while the user is walking; and wherein the accelerometer data reflects a characteristic gait of the user while walking.

7. The method of claim 1, wherein in response to receiving the response from the authentication service, the unattended device performs one or more additional authentication operations, including one or more of the following:
   asking the user for additional confirmation information;
   using a camera to identify the user's face, iris, eyes, body shape or body structure;
   using video capture to extract the user's gait, movement, or other biokinematic characteristics;
   using audio capture to recognize the user's voice;
   asking the user to insert, swipe or tap a device with a bank card;
   asking the user to perform an action on their portable electronic device;
   using a weight sensor to measure the user's weight;
   asking the user for another form of identification; and
   asking the user for a form of payment or collateral.

8. The method of claim 1, wherein sensing the presence of the user in proximity to the unattended device involves the unattended device sensing the proximity of the user through one or more of the following:
   a signal to or from the portable electronic device;
   a camera;
   an audio sensor;
   an ultrasound sensor; and
   an infrared sensor.

9. The method of claim 1, wherein sensing the presence of the user in proximity to the unattended device involves the portable electronic device sensing proximity of the unattended device using one or more of the following:
   a Bluetooth signal;
   a Wi-Fi signal;
   a near-field communication (NFC) signal;
   a Zigbee signal;
   a near-range radio signal;
   an audio signal;
   an ultrasound signal;
   a beacon; and
   a geofenced region.

10. The method of claim 1, wherein responsive to sensing that the user is no longer in proximity to the unattended device, the method further comprises de-authenticating the user, or logging the user out.

11. The method of claim 1, wherein the method further comprises enabling the user to delegate access to the unattended device by presenting an interface to the user, wherein the interface enables the user to specify:
   an identity of a delegated user; and
   a context for the delegated access.

12. The method of claim 1, wherein the unattended device comprises one of the following:
   an automated teller machine (ATM);
   a ticketing kiosk;
   a vending machine;
   a parking meter;
   a package pickup locker;
   a vehicle;
   a door lock;
   a gate;
   a piece of heavy machinery; and
   a targeted advertising system.

13. The method of claim 1, wherein the one or more sensors include one or more of the following:
   an accelerometer;
   a gyroscope;
   an inertial sensor;
   an ambient light sensor;
   an image sensor;
   a camera;
   a temperature sensor;
   a barometric-pressure sensor;
   a cellular-radio-signal-strength sensor;
   a Bluetooth-radio-signal-strength sensor;
   a near-field communication (NFC) sensor;
   a network-proximity sensor;
   an infrared sensor, and
   a magnetometer.

14. The method of claim 1, further comprising:
   generating a security score for each of multiple authorized users of the portable electronic device, including the user; and
   identifying the user based on the security scores.

15. A non-transitory computer-readable storage medium storing instructions that when executed by a computer cause the computer to perform a method for authenticating a user of an unattended device, the method comprising:
   collecting sensor data from one or more sensors in a portable electronic
   device possessed by the user in response to trigger events sent at a variable
   interval determined based on feedback generated by a learner that processes the collected sensor data, the generated feedback being based, at least in part, on a change in a confidence level of the identity of the user, a battery level of the portable electronic device, a usage pattern of the portable electronic device, and a notification received at the portable electronic device;
   in response to sensing a presence of the user in proximity to the unattended device, making a call from the unattended device to an authentication service to authenticate the user;
   in response to the call, the authentication service authenticating the user based, at least in part on the collected sensor data; and
   responsive to authentication succeeding, allowing the user to proceed with an interaction with the unattended device.

16. The non-transitory computer-readable storage medium of claim 15, wherein the authentication service is located in one of the following:
   a cloud server;
   the unattended device; and
   the portable electronic device.

17. The non-transitory computer-readable storage medium of claim 15, wherein prior to authenticating the user, the authentication service receives the collected sensor data, or alternatively a feature vector generated from the collected sensor data, from the portable electronic device.

18. The non-transitory computer-readable storage medium of claim 15, wherein authenticating the user involves:
   extracting a feature vector from the sensor data; and
   analyzing the feature vector to authenticate the user, wherein the feature vector is analyzed using a model trained with sensor data previously obtained from the portable electronic device while the user was in control of the portable electronic device.

19. The non-transitory computer-readable storage medium of claim 15, wherein the sensor data includes movement-related sensor data caused by movement of the portable electronic device while the portable electronic device is under the control of the user.

20. The non-transitory computer-readable storage medium of claim 19,
wherein the movement-related sensor data includes accelerometer data gathered while the user is walking; and
wherein the accelerometer data reflects a characteristic gait of the user while walking.

21. The non-transitory computer-readable storage medium of claim 15, wherein responsive to receipt of the response from the authentication service,
the unattended device is to perform one or more additional authentication operations, including one or more of the following:
asking the user for additional confirmation information;
using a camera to identify the user's face, iris, eyes, body shape or body structure;
using video capture to extract the user's gait, movement, or other biokinematic characteristics;
using audio capture to recognize the user's voice;
asking the user to insert, swipe or tap a device with a bank card;
asking the user to perform an action on their portable electronic device;
using a weight sensor to measure the user's weight;
asking the user for another form of identification; and
asking the user for a form of payment or collateral.

22. The non-transitory computer-readable storage medium of claim 15, wherein sensing the presence of the user in proximity to the unattended device involves the unattended device sensing the proximity of the user through one or more of the following:
a signal to or from the portable electronic device;
a camera;
an audio sensor;
an ultrasound sensor; and
an infrared sensor.

23. The non-transitory computer-readable storage medium of claim 15, wherein sensing the presence of the user in proximity to the unattended device involves the portable electronic device sensing proximity of the unattended device using one or more of the following:
a Bluetooth signal;
a Wi-Fi signal;
a near-field communication (NFC) signal;
a Zigbee signal;
a near-range radio signal;
an audio signal;
an ultrasound signal;
a beacon; and
a geofenced region.

24. The non-transitory computer-readable storage medium of claim 15, wherein responsive to sensing that the user is no longer in proximity to the unattended device, the method further comprises de-authenticating the user, or logging the user out.

25. The non-transitory computer-readable storage medium of claim 15, wherein the method further comprises enabling the user to delegate access to the unattended device by presenting an interface to the user, wherein the interface enables the user to specify:
an identity of a delegated user; and
a context for the delegated access.

26. A system to authenticate a user of an unattended device, comprising:
at least one processor and at least one associated memory; and
an authenticator to execute on the at least one processor, wherein during operation, the authenticator is to:
collect sensor data from one or more sensors in a portable electronic device possessed by the user in response to trigger events sent at a variable interval to be determined based on feedback generated by a learner that processes the collected sensor data;
make a call from the unattended device to an authentication service to authenticate the user in response to sensing a presence of the user in proximity to the unattended device;
in response to the call, the authentication service is to authenticate the user based, at least in part, on the collected sensor data; and
responsive to authentication succeeding, is to allow the user to proceed with an interaction with the unattended device.

27. The system of claim 26, wherein the authentication service is located in one of the following:
a cloud server;
the unattended device; and
the portable electronic device.

28. The system of claim 26, wherein prior to authenticating the user, the authentication service is to receive the collected sensor data, or alternatively a feature vector to be generated from the collected sensor data, from the portable electronic device.

29. The system of claim 26, wherein while authenticating the user, the authenticator is to:
extract a feature vector from the sensor data; and
analyze the feature vector to authenticate the user, wherein the feature vector is to be analyzed using a model trained with sensor data obtained from the portable electronic device while the user was co-located with the portable electronic device.

30. The system of claim 26, wherein the sensor data is to include movement-related sensor data based, at least in part, on movement of the portable electronic device while the portable electronic device was co-located with the user.

31. The system of claim 30, wherein the movement-related sensor data is to include accelerometer data to be gathered while the user is walking; and
wherein the accelerometer data is to reflect a characteristic gait of the user while walking.

32. The system of claim 26, wherein after receiving the response from the authentication service, the authenticator is to perform one or more additional authentication operations, to include one or more of the following:
asking the user for additional confirmation information;
using a camera to identify the user's face, iris, eyes, body shape or body structure;
using video capture to extract the user's gait, movement, or other biokinematic characteristics;
using audio capture to recognize the user's voice;
asking the user to insert, swipe or tap a device with a bank card;
asking the user to perform an action on their portable electronic device;
using a weight sensor to measure the user's weight;
asking the user for another form of identification; and
asking the user for a form of payment or collateral.

33. The system of claim 26, wherein while sensing the presence of the user in proximity to the unattended device, the authenticator is to use the unattended device to sense the proximity of the user through one or more of the following:
a signal to or from the portable electronic device;
a camera;
an audio sensor;

an ultrasound sensor; and an infrared sensor.

34. The system of claim 26, wherein responsive to sensing the presence of the user in proximity to the unattended device, the authenticator is to use the portable electronic device to sense a proximity of the unattended device via one or more of the following:

a Bluetooth signal;

a Wi-Fi signal;

a near-field communication (NFC) signal;

a Zigbee signal;

a near-range radio signal;

an audio signal;

an ultrasound signal;

a beacon; and a geofenced region.

35. The system of claim 26, wherein responsive to sensing that the user is no longer in proximity to the unattended device, the authenticator is to de-authenticate the user, or is to log out the user.

36. The system of claim 26, wherein the authenticator is to enable the user to delegate access to the unattended device via presenting an interface to the user, wherein the interface is to enable the user to specify;

an identity of a delegated user; and a context for the delegated access.

* * * * *